United States Patent
Grzonkowski

(10) Patent No.: US 9,667,575 B1
(45) Date of Patent: May 30, 2017

(54) SYSTEMS AND METHODS FOR DETECTING WEBPAGES BELONGING TO SPAM CAMPAIGNS

(71) Applicant: Symantec Corporation, Mountain View, CA (US)

(72) Inventor: Slawomir Grzonkowski, Galway (IE)

(73) Assignee: Symantec Corporation, Mountain View, CA (US)

( * ) Notice: Subject to any disclaimer, the term of this patent is extended or adjusted under 35 U.S.C. 154(b) by 453 days.

(21) Appl. No.: 14/071,029

(22) Filed: Nov. 4, 2013

(51) Int. Cl.
G06F 15/173 (2006.01)
G06F 15/16 (2006.01)
H04L 12/58 (2006.01)
H04L 12/26 (2006.01)

(52) U.S. Cl.
CPC .............. H04L 51/12 (2013.01); H04L 43/08 (2013.01)

(58) Field of Classification Search
CPC ... H04L 29/08072; H04L 29/06; H04L 43/00; H04L 12/2602; H04L 41/22; H04L 12/585; H04L 12/58; H04L 12/581; H04L 12/5855; H04L 29/0809; H04L 29/08981; G06Q 10/107; G06Q 30/02
USPC ........................................... 709/224
See application file for complete search history.

(56) References Cited

U.S. PATENT DOCUMENTS

| | | | | |
|---|---|---|---|---|
| 6,769,016 B2* | 7/2004 | Rothwell | .............. | H04L 12/585 706/20 |
| 7,185,085 B2* | 2/2007 | Bean | .................. | G06F 11/3495 700/80 |
| 7,716,297 B1* | 5/2010 | Wittel | ................... | H04L 12/585 709/206 |
| 7,751,620 B1* | 7/2010 | Cosoi | ................... | G06K 9/4652 382/168 |
| 8,359,649 B1 | 1/2013 | Sobel et al. | | |
| 8,645,823 B1* | 2/2014 | Thiess | ............... | G06F 17/30905 715/234 |

(Continued)

FOREIGN PATENT DOCUMENTS

CN 18001854 A 7/2006
EP 20050257715 9/2007

(Continued)

OTHER PUBLICATIONS

"Apache SpamAssassin", http://spamassassin.apache.org/, as accessed Aug. 27, 2013, (Jun. 26, 2004).

Primary Examiner — Mahran Abu Roumi
(74) Attorney, Agent, or Firm — FisherBroyles LLP

(57) ABSTRACT

A computer-implemented method for detecting webpages belonging to spam campaigns may include (1) identifying a web address of a suspicious webpage that potentially hosts a spam message, (2) capturing an image of the suspicious webpage, (3) comparing the image of the suspicious webpage to at least one spam image from a spam database, the spam image being associated with a spam campaign in the spam database, (4) determining, based on the comparison of the image of the suspicious webpage with the spam image, whether the suspicious webpage is associated with the spam campaign, and (5) updating the spam database in response to the determination of whether the suspicious webpage is associated with the spam campaign. Various other methods, systems, and computer-readable media are also disclosed.

18 Claims, 6 Drawing Sheets

(56) References Cited

U.S. PATENT DOCUMENTS

| | | | |
|---|---|---|---|
| 8,880,611 B1* | 11/2014 | Lim | H04L 51/12 709/204 |
| 2005/0015626 A1* | 1/2005 | Chasin | H04L 63/0245 726/4 |
| 2007/0239848 A1* | 10/2007 | Avery | G06K 9/2063 709/217 |
| 2008/0159632 A1* | 7/2008 | Oliver | G06K 9/64 382/209 |
| 2008/0235103 A1* | 9/2008 | Baccas | G06Q 30/0282 705/347 |
| 2008/0256093 A1* | 10/2008 | Amitay | G06F 17/30675 |
| 2009/0043853 A1* | 2/2009 | Wei | G06T 7/403 709/206 |
| 2009/0141985 A1* | 6/2009 | Sheinin | G06K 9/00456 382/202 |
| 2010/0158395 A1* | 6/2010 | Sathish | G06K 9/342 382/224 |
| 2012/0042381 A1* | 2/2012 | Antonakakis | H04L 63/1483 726/22 |
| 2012/0087552 A1* | 4/2012 | Lee | G06K 9/00275 382/118 |
| 2012/0216102 A1* | 8/2012 | Malla | G06F 17/241 715/206 |
| 2012/0227104 A1* | 9/2012 | Sinha | H04L 12/585 726/22 |
| 2012/0281911 A1* | 11/2012 | Fung | G06K 9/00677 382/165 |
| 2013/0018884 A1* | 1/2013 | Chandrasekharappa | G06F 17/30985 707/737 |
| 2013/0138428 A1* | 5/2013 | Chandramouli | G06F 17/274 704/9 |
| 2013/0247192 A1* | 9/2013 | Krasser | H04L 63/1425 726/23 |
| 2014/0082182 A1* | 3/2014 | Doan | H04L 43/08 709/224 |
| 2014/0331119 A1* | 11/2014 | Dixon | H04L 63/168 715/234 |
| 2015/0103383 A1* | 4/2015 | Dowling | H04N 1/00225 358/402 |
| 2015/0154607 A1* | 6/2015 | Frome | G06Q 30/018 705/317 |

FOREIGN PATENT DOCUMENTS

| | | |
|---|---|---|
| WO | PCT/US2002/023811 | 2/2003 |
| WO | PCT/US2009/034963 | 11/2009 |
| WO | PCT/US2011/033936 | 5/2013 |

* cited by examiner

SYSTEMS AND METHODS FOR DETECTING WEBPAGES BELONGING TO SPAM CAMPAIGNS

BACKGROUND

Traditional "spamming" techniques have primarily involved sending unsolicited emails containing commercial offerings. More recently, spammers have expanded their reach into other areas of the virtual world, such as mobile communications and social media. In addition to increased exposure to unwanted advertisements, current spam messages may be responsible for a number of security risks, such as phishing websites, scams, and/or other types of malware.

Existing spam prevention techniques may involve checking URLs or phone numbers present in potential spam messages against a database of known spam hosts. However, as spamming methods grow more sophisticated, spammers may use various approaches to evade detection, such as registering several different domains pointing to the same content and changing webhosting providers to obtain new IP addresses. The spam messages created using such techniques may be difficult to identify.

The increased distribution of spam messages and advancements in avoiding detection may compromise the security and reduce the efficiency of browsing webpages, sending mobile communications, and engaging in other Internet-based activities. Accordingly, the instant disclosure identifies a need for additional and improved systems and methods for detecting webpages belonging to spam campaigns.

SUMMARY

As will be described in greater detail below, the instant disclosure generally relates to systems and methods for detecting webpages belonging to spam campaigns by comparing images of webpages potentially hosting spam with images of webpages already associated with spam campaigns. In one example, a computer-implemented method for detecting webpages belonging to spam campaigns may include (1) identifying a web address of a suspicious webpage that potentially hosts a spam message, (2) capturing an image of the suspicious webpage, (3) comparing the image of the suspicious webpage to at least one spam image from a spam database, where the spam image is associated with a spam campaign in the spam database, (4) determining, based on the comparison of the image of the suspicious webpage with the spam image, whether the suspicious webpage is associated with the spam campaign, and (5) updating the spam database in response to the determination of whether the suspicious webpage is associated with the spam campaign.

In one example, comparing the image of the suspicious webpage to the spam image may include calculating a hash of the suspicious webpage and determining whether the hash of the suspicious webpage matches a hash of the spam image. This example may further include determining whether the suspicious webpage is associated with the spam campaign by determining that the hash of the suspicious webpage matches the hash of the spam image. In addition, this example may include updating the spam database by creating, in the spam database, an association between the web address of the suspicious webpage and the spam campaign.

In one embodiment, comparing the image of the suspicious webpage to the spam image may include calculating a distance between the image of the suspicious webpage and the spam image. This embodiment may further include determining whether the suspicious webpage is associated with the spam campaign by determining whether the distance between the image of the suspicious webpage and the spam image is below a difference threshold. In one example, the embodiment may include determining that the distance between the image of the suspicious webpage and the spam image is below the difference threshold. In this case, updating the spam database may include creating, in the spam database, an association between the web address of the suspicious webpage and the spam campaign.

Some embodiments of the instant disclosure may include determining that the distance between the image of the suspicious webpage and the spam image is above the difference threshold. In such embodiments, determining whether the suspicious webpage is associated with the spam campaign may include determining, based on the distance being above the difference threshold, that the suspicious webpage is part of a new spam campaign. Such embodiments may further include updating the spam database by creating, in the spam database, an association between the web address of the suspicious webpage and the new spam campaign.

In one example, comparing the image of the suspicious webpage to the spam image may include calculating a hash of the suspicious image and determining that the hash of the suspicious webpage does not match a hash of the spam image. The example may further include, in response to the determination that the hash of the suspicious webpage does not match the hash of the spam image, calculating a distance between the image of the suspicious webpage and the spam image. In addition, the example may include determining whether the webpage is associated with the spam campaign by determining whether the distance between the image of the suspicious webpage and the spam image is below a difference threshold.

In some embodiments, capturing an image of the suspicious webpage may include normalizing the image of the suspicious webpage and comparing the image of the suspicious webpage to the spam image from the spam database by comparing the normalized image of the suspicious webpage to a normalized spam image from the spam database. In these embodiments, normalizing the image of the suspicious webpage may include scaling the image to a specified resolution and/or converting a color palette of the image to a gray scale.

In one example, determining whether the suspicious webpage is associated with the spam campaign may include determining that the webpage is associated with the spam campaign. The example may further include updating the spam database by creating, in the spam database, an association between the web address of the suspicious webpage and the spam campaign. The example may also include determining that the suspicious webpage is no longer part of the spam campaign, and in response to the determination that the suspicious webpage is no longer part of the spam campaign, removing the association between the web address of the suspicious webpage and the spam campaign.

One embodiment may include, after identifying the web address of the suspicious webpage, determining that the web address of the suspicious webpage does not match any spam web addresses already stored in the spam database. This embodiment may further include capturing the image of the suspicious webpage in response to the determination that the web address of the suspicious webpage does not match any spam web addresses from the spam database.

In one embodiment, a system for implementing the above-described method may include (1) an identification module that identifies a web address of a suspicious webpage that potentially hosts a spam message, (2) an image module that captures an image of the suspicious webpage, (3) a comparison module that compares the image of the suspicious webpage to at least one spam image from a spam database, where the spam image is associated with a spam campaign in the spam database, (4) a determination module that determines, based on the comparison of the image of the suspicious webpage with the spam image, whether the suspicious webpage is associated with the spam campaign, and (5) a database module that updates the spam database in response to the determination of whether the suspicious webpage is associated with the spam campaign. The system may also include one or more processors that execute the identification module, the image module, the comparison module, the determination module, and the database module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a web address of a suspicious webpage that potentially hosts a spam message, (2) capture an image of the suspicious webpage, (3) compare the image of the suspicious webpage to at least one spam image from a spam database, where the spam image is associated with a spam campaign in the spam database, (4) determine, based on the comparison of the image of the suspicious webpage with the spam image, whether the webpage is associated with the spam campaign, and (5) update the spam database in response to the determination of whether the suspicious webpage is associated with the spam campaign.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
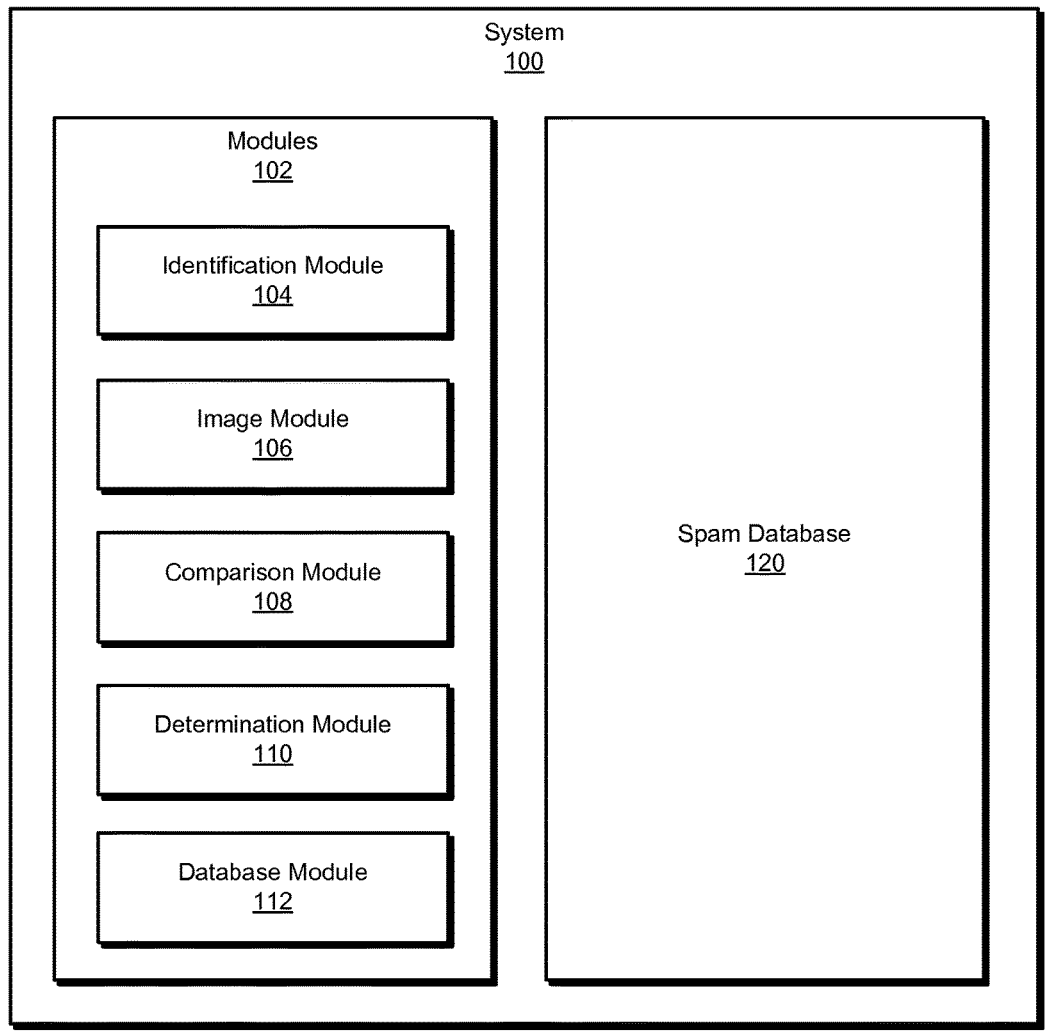
FIG. 1 is a block diagram of an exemplary system for detecting webpages belonging to spam campaigns.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting webpages belonging to spam campaigns. As will be explained in greater detail below, by comparing images of potential spam messages with images of spam messages that are part of known spam campaigns, the systems and methods described herein may enable detection of spam messages based on message content alone, rather than identifiers (e.g., Uniform Resource Locators (URLs) and Internet Protocol (IP) addresses) that may be easily altered or faked. These systems and methods may enable detection of spam messages distributed via webpages, mobile communications, social media, and other platforms that are associated with known spam campaigns, as well as spam messages that are not associated with a known spam campaign.

Figure 2:
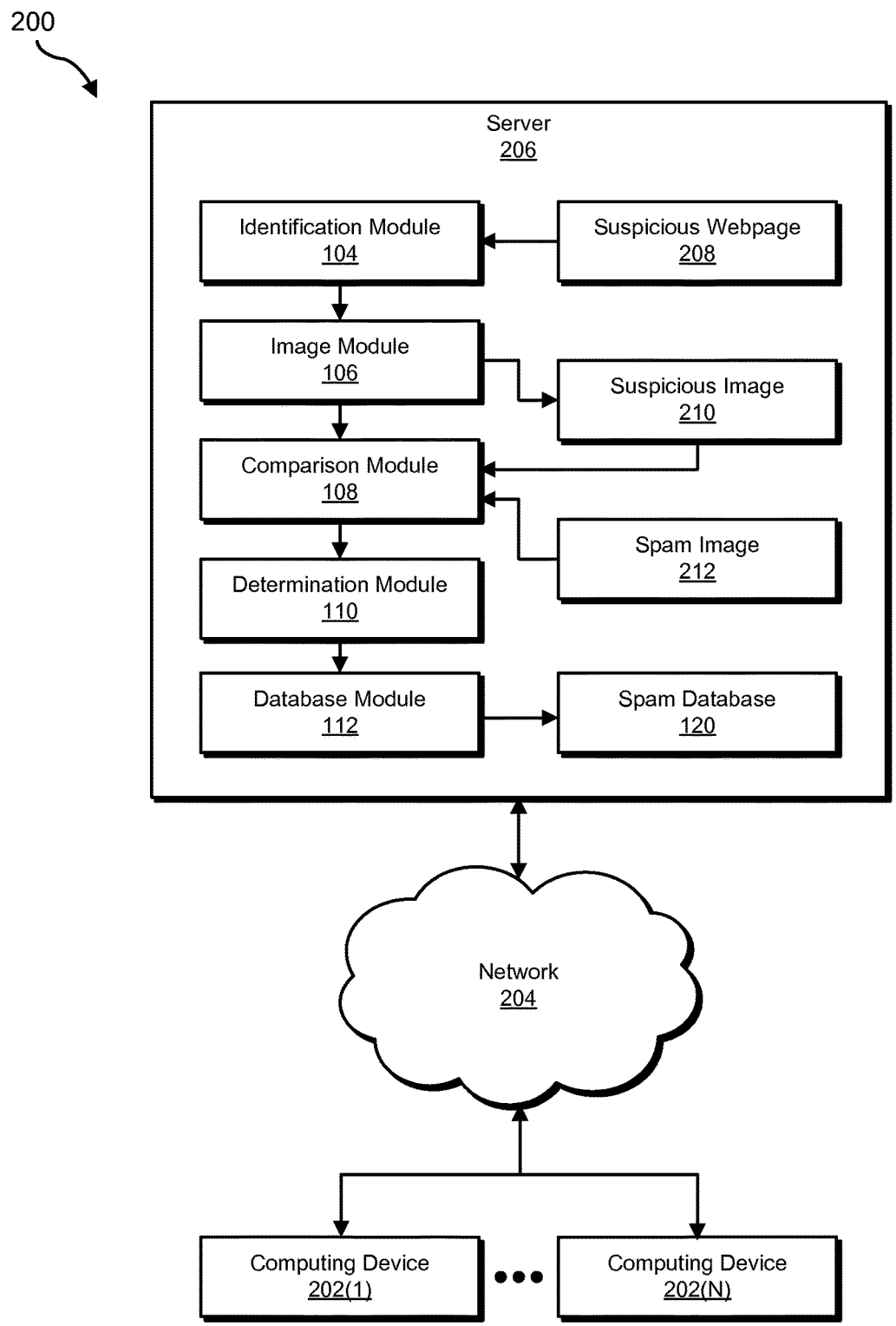
FIG. 2 is a block diagram of an additional exemplary system for detecting webpages belonging to spam campaigns.

The following will provide, with reference to FIGS. 1-2, detailed descriptions of exemplary systems for detecting webpages belonging to spam campaigns. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for detecting webpages belonging to spam campaigns. As illustrated in this figure, exemplary system 100 may include one or more modules 102 for performing one or more tasks. For example, and as will be explained in greater detail below, exemplary system 100 may include an identification module 104 that identifies a web address of a suspicious webpage that potentially hosts a spam message. Exemplary system 100 may also include an image module 106 that captures an image of the suspicious webpage.

In addition, and as will be described in greater detail below, exemplary system 100 may include a comparison module 108 that compares the image of the suspicious webpage to at least one spam image from a spam database (e.g., spam database 120). The spam images in the spam database may be associated with one or more spam campaigns. Exemplary system 100 may also include a determination module 110 that determines, based on the comparison of the image of the suspicious webpage with the spam image, whether the suspicious webpage is associated with the spam campaign. Additionally, exemplary system 100 may include a database module 112 that updates the spam database (e.g., spam database 120) in response to the determination of whether the suspicious webpage is associated with the spam image. Although illustrated as separate elements, one or more of modules 102 in FIG. 1 may represent portions of a single module or application.

As used herein, the phrase "spam campaign" generally refers to any type or form of electronic distribution of spam messages. A spam campaign may involve providing unsolicited spam messages via email, newsgroups, web engine search results, blogs, wikis, online classifieds, mobile phone messaging, Internet forums, fax transmissions, social networking services, file sharing, television, and/or in any other manner. A spam campaign may involve one or more spam messages associated with a particular product, service, malicious exploit, etc. In a spam campaign, spam messages may be transmitted in bulk and/or indiscriminately. As used herein, the term "spam message" generally refers to any type or form of unsolicited electronic message.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as spam database 120. In one example, spam database 120 may be configured to store associations between web addresses and spam campaigns. For example, spam database 120 may be configured to store associations between web addresses and existing spam campaigns, as well as associations between web addresses and new spam campaigns. In addition, one or more of the modules described herein may update spam database 120 to remove associations between web addresses and spam campaigns in response to determining that a webpage hosted at the web address is no longer associated with the spam campaign.

Spam database 120 may represent portions of a single database or a plurality of databases or computing devices. For example, spam database 120 may represent a portion of server 206 in FIG. 2, computing system 510 in FIG. 5, and/or portions of exemplary network architecture 600 in FIG. 6. Alternatively, spam database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202(1)-(N) in communication with a server 206 via a network 204. In one example, computing devices 202(1)-(N) may be programmed with one or more of modules 102 and/or may store all or a portion of the data in spam database 120. Additionally or alternatively, server 206 may be programmed with one or more of modules 102 and/or may store all or a portion of the data in spam database 120. In some embodiments, server 206 may represent an anti-spam server and/or anti-spam service. In such embodiments, computing devices 202(1)-(N) may represent user devices and/or other devices that report spam messages (e.g., URLs potentially hosting spam messages) to server 206.

In one embodiment, one or more of modules 102 from FIG. 1 may, when executed by at least one processor of computing devices 202(1)-(N) and/or server 206, enable computing devices 202(1)-(N) and/or server 206 to detect webpages belonging to spam campaigns. For example, and as will be described in greater detail below, identification module 104 may cause server 206 to identify a web address of a suspicious webpage (e.g., suspicious webpage 208) that potentially hosts a spam message. Image module 106 may cause server 206 to capture an image (e.g., suspicious image 210) of suspicious webpage 208. Comparison module 108 may cause server 206 to compare suspicious image 210 to at least one image (e.g., spam image 212) from spam database 120. Determination module 110 may cause server 206 to determine, based on the comparison of suspicious image 210 with spam image 212, whether suspicious webpage 208 is associated with a spam campaign. Database module 112 may then update spam database 120 in response to the determination of whether suspicious webpage 208 is associated with a spam campaign.

Computing devices 202(1)-(N) generally represent any type or form of computing device capable of reading computer-executable instructions. Examples of computing devices 202(1)-(N) include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Server 206 generally represents any type or form of computing device that is capable of storing, analyzing, and/or providing information relating to associations between web addresses and spam campaigns. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
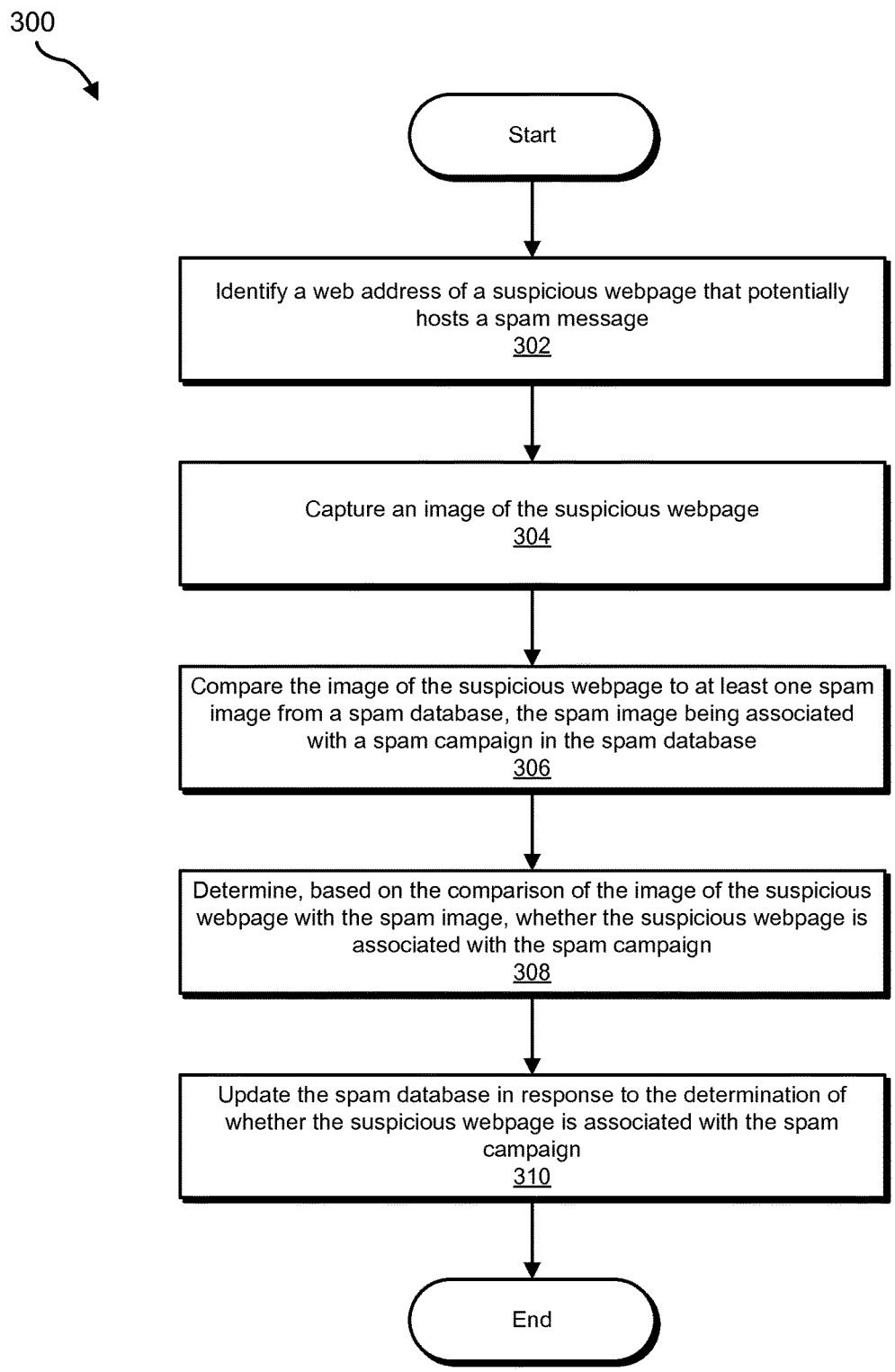
FIG. 3 is a flow diagram of an exemplary method for detecting webpages belonging to spam campaigns.

FIG. 3 is a flow diagram of an exemplary computer-implemented method 300 for detecting webpages belonging to spam campaigns. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a web address of a suspicious webpage that potentially hosts a spam message. For example, identification module 104 may identify a web address of suspicious webpage 208. As used herein, the phrase "suspicious webpage" generally refers to any type or form of webpage identified as possibly providing a spam message. A "web address" of a suspicious webpage may include any type or form of information that identifies or points to a web page (e.g., a Uniform Resource Identifier (URI), a Uniform Resource Locator (URL), a domain name, etc.).

The systems described herein may perform step 302 in a variety of ways. For example, identification module 104 may operate as part of either a client-side or server-side device. In some examples, identification module 104 may be installed on server 206 as part of a server-side anti-spam service. In these examples, identification module 104 may identify the web address of suspicious webpage 208 by crawling the web for potential spam messages. Additionally or alternatively, identification module 104 may identify the web address of suspicious webpage 208 by receiving a notification from a client of the anti-spam service that has identified a potential spam message.

In other examples, identification module 104 may be installed on one or more of computing devices 202(1)-(N) as part of a client-side anti-spam service. In these examples, identification module 104 may identify the web address of suspicious webpage 208 by checking the content of email messages when they are received by an email service operating on one or more of computing devices 202(1)-(N). Additionally or alternatively, identification module 104 may identify the web address of suspicious webpage 208 when a user of one of computing devices 202(1)-(N) accesses potential spam messages (e.g., by browsing webpages, sending and receiving mobile communications, etc.). In these examples, after identifying the web address of suspicious webpage 208, identification module 104 may forward the web address of suspicious webpage 208 to server 206.

At step 304, the systems described herein may capture an image of the suspicious webpage. For example, image module 106 may, as part of server 206 in FIG. 2, capture suspicious image 210. As used herein, the term "image" generally refers to any type or form of visual representation of information. Captured images may include numeric representations (e.g., binary representations) of two or three dimensional images. Images may be captured in any suitable type (e.g., vector, raster, etc.) or format (e.g., JPEG, JIF, TIFF, RAW, GIF, BMP, PNG, PAM, CBM, SVG, etc.).

The systems described herein may perform step 304 in a variety of ways. In some examples, image module 106 may capture suspicious image 210 by taking a screenshot of suspicious webpage 208. Image module 106 may also capture suspicious image 210 by creating a copy of suspicious webpage 208. Additionally or alternatively, image module 106 may capture suspicious image 210 by saving suspicious webpage 208 to an image file format.

Additionally, capturing suspicious image 210 may include processing suspicious image 210. In some examples, processing suspicious image 210 may include normalizing suspicious image 210 with respect to resolution (e.g., by scaling suspicious image 210 to a specified resolution, such as an 800×600 pixel array). Processing suspicious image 210 may also include normalizing suspicious image 210 with respect to color (e.g., by converting the color palette of suspicious image 210 to a gray scale). By normalizing images of suspicious webpages, the systems and methods described herein may facilitate determining that similar spam messages (i.e., spam messages that only differ in small details) belong to the same spam campaign.

Returning to FIG. 3, at step 306 the systems described herein may compare the image of the suspicious webpage to at least one spam image from a spam database. For example, comparison module 108 may, as part of server 206 in FIG. 2, compare suspicious image 210 with spam image 212.

The systems described herein may perform step 306 in a variety of ways. For example, comparison module 108 may compare the image of the suspicious webpage to the spam image by calculating a distance between the image of the suspicious webpage and the spam image. The phrase "calculating a distance," as used herein, generally refers to any process of numerically determining a level of similarity between two or more images. For example, the color of each pixel in an image may be stored as a numerical value (e.g., 0-255). The pixels that comprise each image may then be stored together as a multi-dimensional vector (e.g., a matrix or sets of coordinates). A numerical representation of the overall similarity between two images may be found by using various methods of computing average distances in vector space (e.g., Euclidean distance, Manhattan distance, Chebyshev distance, etc.).

As part of or instead of calculating a distance between the suspicious image and the spam image, comparison module 108 may calculate and compare hashes of the suspicious image and the spam image. In one example, comparison module 108 may compare suspicious image 210 with spam image 212 by calculating a hash of suspicious image 210 and then determining whether the hash of suspicious image 210 matches a hash of spam image 212. The hash of the spam image may be calculated in real-time (e.g., at the time of the comparison) or ahead of time (e.g., the hash of the spam image may be calculated and stored in spam database 120 and retrieved for use in the comparison). Calculating the hashes of suspicious image 210 and spam image 212 may be performed with a SHA algorithm, a MD5 algorithm, or any other suitable algorithm. In some examples, calculating the hashes of suspicious image 210 and spam image 212 may be performed after the image is processed and/or may only be performed on the data section of the images (i.e., the hashes may not include the header and/or metadata contained within the image).

In some embodiments, the systems described herein may use both hash comparisons and distance comparisons to compare suspicious images with spam images. For example, comparison module 108 may first compare suspicious image 210 with spam image 212 by calculating a hash of suspicious image 210 and then determining whether the hash of suspicious image 212 matches a hash of spam image 212. If the hashes match, no further analysis may be needed. If the hashes do not match, comparison module 108 may perform a deeper analysis by calculating a distance between suspicious image 210 and spam image 212.

In some examples, comparison module 108 may compare suspicious image 210 with spam image 212 by comparing a normalized version of suspicious image 210 to a normalized version of spam image 212. For example, comparison module 108 may calculate and compare hashes of normalized versions of spam image 212 and suspicious image 210. Additionally or alternatively, comparison module 108 may calculate a distance between normalized versions of spam image 212 and suspicious image 210.

Returning to FIG. 3, at step 308 the systems described herein may determine whether the suspicious webpage is associated with the spam campaign based on the comparison of the image of the suspicious webpage with the spam image. For example, determination module 110 may, as part of server 206 in FIG. 2, determine whether suspicious webpage 208 is associated with the spam campaign based on the comparison of suspicious image 210 with spam image 212.

The systems described herein may determine whether the suspicious webpage is associated with the spam campaign in any suitable manner. In one example, if comparison module 108 compared suspicious image 210 with spam image 212 by calculating a hash of suspicious image 210 and then determining whether the hash of suspicious image 210 matches a hash of spam image 212, determination module 110 may determine that the suspicious webpage is associated with the spam campaign by determining that the hash of suspicious image 210 matches the hash of spam image 212.

In some examples, if comparison module 108 compared suspicious image 210 with spam image 212 by calculating the distance between suspicious image 210 and spam image 212, determination module 110 may determine whether the suspicious webpage is associated with the spam campaign by determining whether the distance between suspicious image 210 and spam image 212 is below a difference threshold. In some examples, the difference threshold may be a static threshold (e.g., a default threshold, a threshold set by an administrator, etc.). Alternatively, the difference threshold may be a dynamic threshold that changes in response to various factors (e.g., the number of images in spam database 120, the number of images found to be under the difference threshold, the source of suspicious image 210, etc.).

In some examples, determination module 110 may determine that the distance is below the difference threshold. The distance being below the threshold may indicate that the suspicious image is similar in content to the spam image to which it is compared and therefore may belong to the same spam campaign as the spam image. Additionally, in some examples determination module 110 may determine that the distance is above the difference threshold. The difference being above the threshold may indicate that the suspicious image is not similar in content to the spam image and therefore may not belong to the same spam campaign as the spam image. If determination module 110 indicates that the suspicious image does not belong to the same spam campaign, determination module 110 may then determine that the suspicious image is part of a new spam campaign (i.e., a spam campaign that is not yet identified or tracked in spam database 120).

Returning to FIG. 3, at step 310 the systems described herein may update the spam database in response to the determination of whether the suspicious webpage is associated with the spam campaign. For example, database module 112 may, as part of server 206 in FIG. 2, update spam database 120 in response to the determination of whether suspicious webpage 208 is associated with the spam campaign. Database module 112 may update spam database 120 by creating an association between the web address of the suspicious webpage and the spam campaign, by creating an association between the web address of the suspicious webpage and a new spam campaign, by removing an association between the suspicious webpage and the spam campaign, and/or in any other suitable manner.

For example, if determination module 110 determines that the hash of suspicious image 210 matches the hash of spam image 212, database module 112 may update spam database 120 by creating, in spam database 120, an association between the web address of suspicious webpage 208 and the spam campaign. Similarly, if determination module 110 determines that the distance between suspicious image 210 and spam image 212 is below the difference threshold, database module 112 may update spam database 120 by creating, in spam database 120, an association between the web address of suspicious webpage 208 and the spam campaign. In some examples, if determination module 110 determines that suspicious webpage 208 is part of the new spam campaign, database module 112 may update spam database 120 by creating, in spam database 120, an association between the web address of suspicious webpage 208 and a new spam campaign.

The term "association," as used herein, generally refers to any reference, link, or connection between a web address and a spam campaign that indicates that the web address hosts a spam message that is part of the spam campaign. For example, an association may be a relationship in an SQL database or a dependency in an ACCESS database.

In other examples, the systems described herein may be used to remove associations between webpages and spam campaigns. For example, after an association has been made between the web address of suspicious webpage 208 and the spam campaign, determination module 110 may determine that suspicious webpage 208 is no longer part of the spam campaign (e.g., the web address hosting suspicious webpage 208 is now hosting different content or is no longer accessible). In this case, database module 112 may remove the association between the web address of suspicious webpage 208 and the spam campaign.

Furthermore, in some examples database module 112 may store associations between web addresses and spam campaigns in a hierarchy that indicates some spam images depend from one or more "parent" images. For example, a parent image may represent the first image identified in a spam campaign and dependent images (e.g., "child" images) may have subsequently been recognized as part of the same campaign. If the parent image is removed from spam database 120, the child images may no longer be associated with each other under the parent image. In this case, database module 112 may replace the removed parent image with one of the child images such that the child images have a common connection.

In some examples, the systems described herein may further include an initial analysis step to determine whether the web address of the suspicious webpage matches any spam web addresses already stored in the spam database. For example, after identification module 104 identifies the web address of suspicious webpage 208, determination module 110 may determine whether the web address of suspicious webpage 208 matches any spam web addresses already stored in spam database 120. If determination module 110 determines that the web address of suspicious webpage 208 does not match any spam web addresses already stored in spam database 120, the systems described herein may proceed with capturing the image of the suspicious webpage and/or any other steps described herein. However, if determination module 110 determines that the web address of suspicious webpage 208 does match one or more of the spam web addresses already stored in spam database 120, no further analysis may be necessary as the spam message hosted by the web address may already be associated with a spam campaign in spam database 120.

In other examples, the systems described herein may display any or all of the results of the analysis described above to a user. For example, if a user is a client of an anti-spam service that has installed one or more of modules 102 onto a computing device and/or server, the modules may be programmed to notify the user (e.g., by sending a message, a pop-up alert, or any suitable notification) that a spam message has been identified and/or analyzed. The notification may occur at any point during or after the analysis. For example, the user may be notified that identification module 104 has identified the web address of a suspicious webpage. The user may also be notified that determination module 110 has determined that the suspicious webpage is associated with the spam campaign and/or that database module 112 has updated the spam database with an association between the suspicious webpage and the spam campaign.

Figure 4:
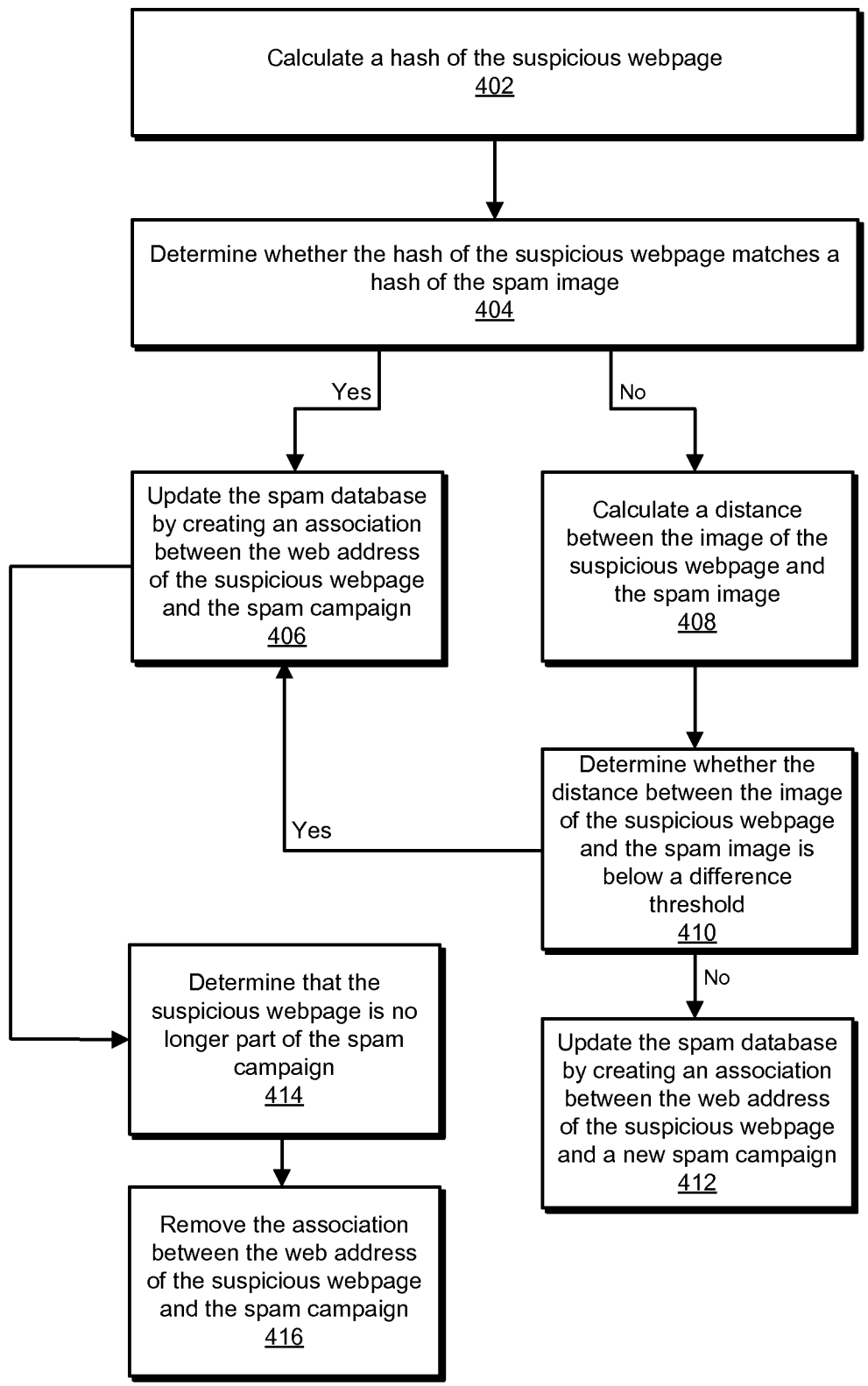
FIG. 4 is a flow diagram of an additional exemplary method for detecting webpages belonging to spam campaigns.

FIG. 4 is a flow diagram of an exemplary method for detecting webpages belonging to spam campaigns. The following will provide, with reference to FIG. 4, an overview of possible steps and decision points for comparing images of suspicious webpages with spam images associated with spam campaigns.

At step 402, comparison module 108 may calculate a hash of the suspicious webpage. Next, at decision point 404, determination module 110 may determine whether the hash of the suspicious webpage matches a hash of the spam image. If determination module 110 determines that the hash of the suspicious webpage matches the hash of the spam image, database module 112 may then, at step 406, update the spam database by creating an association between the web address of the suspicious webpage and the spam campaign. If determination module 110 determines that the hash of the suspicious webpage does not match a hash of the spam image, comparison module 108 may then, at step 408, calculate a distance between the image of the suspicious webpage and the spam image.

After comparison module 108 calculates a distance between the image of the suspicious webpage and the spam image, determination module 110 may, at decision point 410, determine whether the distance between the image of the suspicious webpage and the spam image is below a difference threshold. If determination module 110 determines that the distance between the image of the suspicious webpage and the spam image is below the difference threshold, database module 112 may, at step 406, update the spam database by creating an association between the web address of the suspicious webpage and the spam campaign. If determination module 110 determines that the distance between the image of the suspicious webpage and the spam image is not below the difference threshold, database module 112 may, at step 412, update the spam database by creating an association between the web address of the suspicious webpage and a new spam campaign.

Once database module 112 creates an association between the web address of the suspicious webpage and the spam campaign, determination module 110 may, at step 414, determine that the suspicious webpage is no longer part of the spam campaign. In response to the determination that the suspicious webpage is no longer part of the spam campaign, database module 112 may, at step 416, remove the association between the web address of the suspicious webpage and the spam campaign.

The systems and methods disclosed herein may be implemented in a variety of ways and provide a number of advantages. For example, by detecting webpages belonging to spam campaigns, the systems and methods described herein may aid in the recognition and classification of spam messages that may not have been identified by traditional anti-spam approaches. In addition, embodiments of the instant disclosure may decrease the distribution of unwanted spam messages. In this way, users may be provided with a more efficient, secure experience when performing online activities such as browsing webpages, checking emails, etc.

Figure 5:
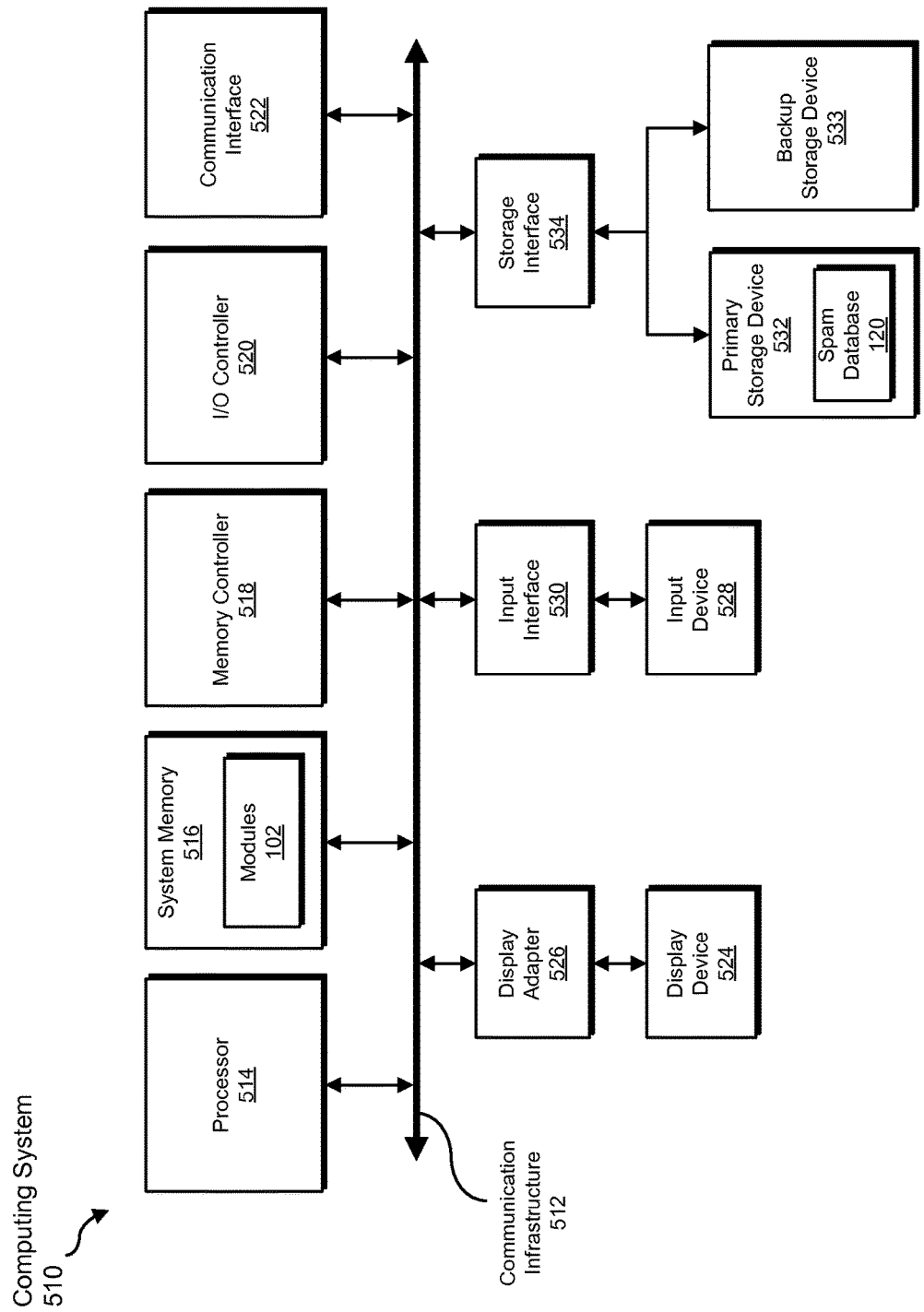
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, spam database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
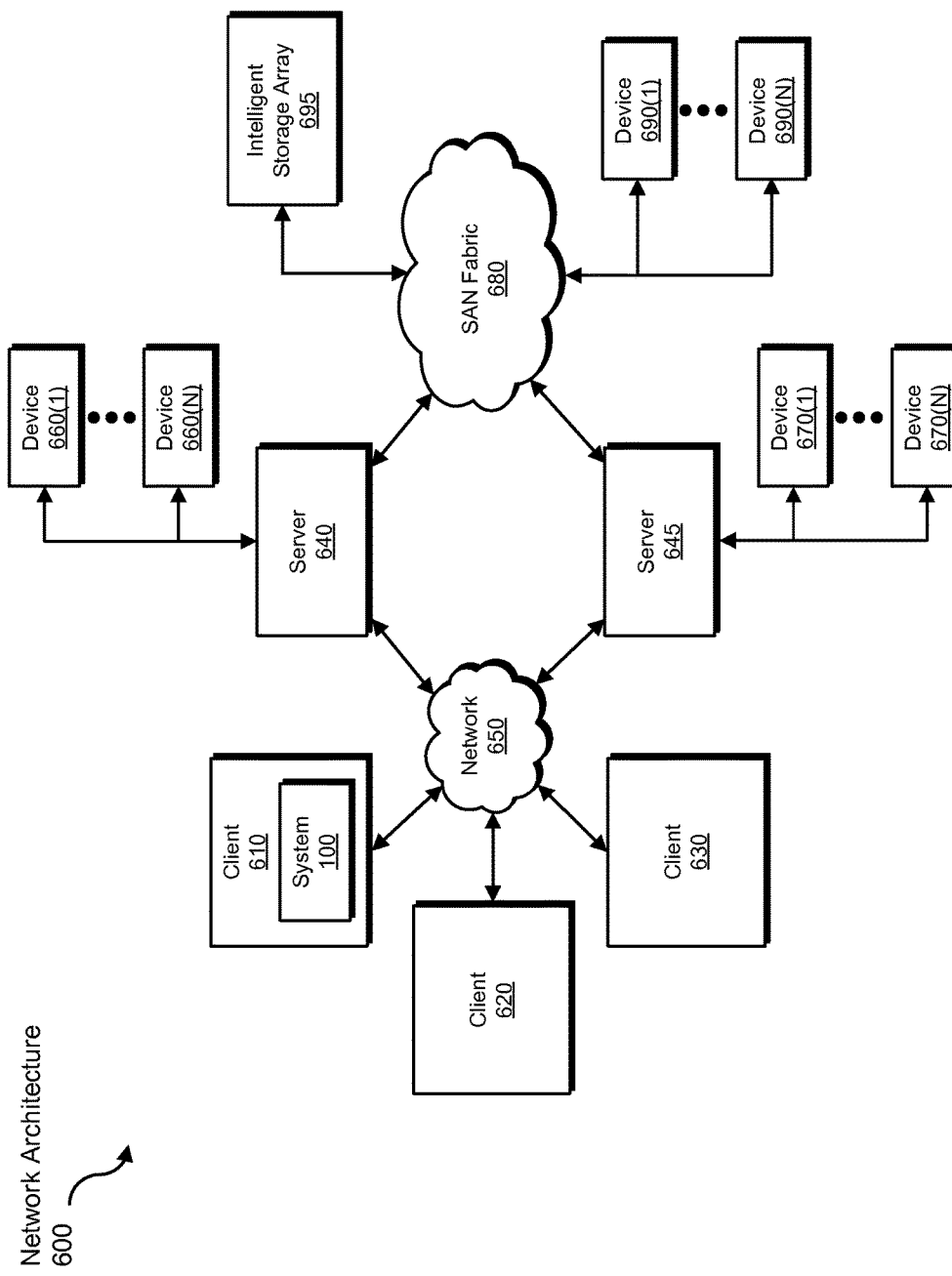
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting webpages belonging to spam campaigns.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform an image to various image file formats and/or may transform an image to a normalized representation of the image. In addition, one or more of the modules described herein may transform information relating to the similarity of two or more images into associations in a database.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting webpages belonging to spam campaigns, at least a portion of the method being performed by a computing device comprising at least one processor, the method comprising:
   receiving, at a backend anti-spam server from a client-side anti-spam service, a web address of a suspicious webpage that potentially hosts a spam message;
   performing, by the backend anti-spam server, an initial analysis step on the web address of the suspicious webpage by determining that the web address of the suspicious webpage does not match any spam web addresses already stored in a spam database;
   in response to determining that the web address of the suspicious webpage does not match any of the spam web addresses already stored in the spam database, using a processor of the backend anti-spam server to:
   capture an image of the suspicious webpage; and
   normalize the image of the suspicious webpage by scaling the image to a specified resolution;
   comparing, by the backend anti-spam server, the image of the suspicious webpage to at least one spam image from the spam database by calculating a distance between the image of the suspicious webpage and the spam image, the spam image being associated with a spam campaign in the spam database;

determining, by the backend anti-spam server, whether the web address of the suspicious webpage is associated with the spam campaign by determining whether the distance between the image of the suspicious webpage and the spam image is below a difference threshold; and in response to the determination of whether the web address of the suspicious webpage is associated with the spam campaign, updating, by the backend anti-spam server, an association between the web address of the suspicious webpage and the spam campaign in the spam database.

2. The computer-implemented method of claim 1, wherein:
comparing the image of the suspicious webpage to the spam image further comprises:
calculating a hash of the suspicious webpage, and determining whether the hash of the suspicious webpage matches a hash of the spam image;
determining whether the web address of the suspicious webpage is associated with the spam campaign further comprises determining that the hash of the suspicious webpage matches the hash of the spam image; and
updating the association between the web address of the suspicious webpage and the spam campaign in the spam database comprises creating the association.

3. The computer-implemented method of claim 1, wherein:
determining whether the distance between the image of the suspicious webpage and the spam image is below the difference threshold comprises determining that the distance is below the difference threshold; and
updating the association between the web address of the suspicious webpage and the spam campaign in the spam database comprises creating the association.

4. The computer-implemented method of claim 1, wherein:
determining whether the distance between the image of the suspicious webpage and the spam image is below the difference threshold comprises determining that the distance is above the difference threshold;
determining whether the web address of the suspicious webpage is associated with the spam campaign comprises determining, based on the distance being above the difference threshold, that the web address of the suspicious webpage is part of a new spam campaign; and
further comprising creating, in the spam database, an association between the web address of the suspicious webpage and the new spam campaign.

5. The method of claim 1, wherein:
comparing the image of the suspicious webpage to the spam image further comprises:
calculating a hash of the suspicious webpage, and determining that the hash of the suspicious webpage does not match a hash of the spam image; and
calculating the distance between the image of the suspicious webpage and the spam image is performed in response to the determination that the hash of the suspicious webpage does not match the hash of the spam image.

6. The method of claim 1, wherein comparing the image of the suspicious webpage to the spam image from the spam database comprises comparing the normalized image of the suspicious webpage to a normalized spam image from the spam database.

7. The method of claim 1, wherein normalizing the image of the suspicious webpage further comprises converting a color palette of the image to a gray scale.

8. The method of claim 1, wherein:
determining whether the web address of the suspicious webpage is associated with the spam campaign comprises determining that the web address of the suspicious webpage is associated with the spam campaign;
updating the association between the web address of the suspicious webpage and the spam campaign in the spam database comprises creating the association; and
the method further comprises:
determining that the web address of the suspicious webpage is no longer part of the spam campaign, and
in response to the determination that the web address of the suspicious webpage is no longer part of the spam campaign, removing the association between the web address of the suspicious webpage and the spam campaign.

9. The method of claim 1, wherein:
determining whether the web address of the suspicious webpage is associated with the spam campaign comprises determining that the image of the suspicious webpage represents a child image that depends from a parent image within the spam campaign; and
updating the association between the web address of the suspicious webpage and the spam campaign in the spam database comprises indicating the hierarchical relationship between the image of the suspicious webpage and the parent image within the spam campaign.

10. The method of claim 1, wherein the web address of the suspicious webpage comprises a uniform resource locator that points to the suspicious webpage.

11. A system for detecting webpages belonging to spam campaigns, the system comprising:
an identification module, stored in memory, that receives, as part of a backend anti-spam server from a client-side anti-spam service, a web address of a suspicious webpage that potentially hosts a spam message;
a determination module, stored in memory, that performs, as part of the backend anti-spam server, an initial analysis step on the web address of the suspicious webpage by determining that the web address of the suspicious webpage does not match any spam web addresses already stored in a spam database;
an image module, stored in memory, that uses a processor of the backend anti-spam server to:
capture an image of the suspicious webpage in response to the determination that the web address of the suspicious webpage does not match any of the spam web addresses already stored in the spam database; and
normalize the image of the suspicious webpage by scaling the image to a specified resolution;
a comparison module, stored in memory, that compares, as part of the backend anti-spam server, the image of the suspicious webpage to at least one spam image from the spam database by calculating a distance between the image of the suspicious webpage and the spam image, the spam image being associated with a spam campaign in the spam database;
wherein the determination module further determines, as part of the backend anti-spam server, whether the web address of the suspicious webpage is associated with the spam campaign by determining whether the distance between the image of the suspicious webpage and the spam image is below a difference threshold;

a database module, stored in memory, that updates, as part of the backend anti-spam server, an association between the web address of the suspicious webpage and the spam campaign in the spam database in response to the determination of whether the web address of the suspicious webpage is associated with the spam campaign; and at least one processor that executes the identification module, the image module, the comparison module, the determination module, and the database module.

12. The system of claim 11, wherein:
the comparison module further compares the image of the suspicious webpage to the spam image by:
calculating a hash of the suspicious webpage, and
determining whether the hash of the suspicious webpage matches a hash of the spam image;
the determination module further determines whether the web address of the suspicious webpage is associated with the spam campaign by determining that the hash of the suspicious webpage matches the hash of the spam image; and
the database module updates the association between the web address of the suspicious webpage and the spam campaign the spam database by creating the association.

13. The system of claim 11, wherein:
the determination module determines whether the distance between the image of the suspicious webpage and the spam image is below the difference threshold by determining that the distance is below the difference threshold; and
the database module updates the association between the web address of the suspicious webpage and the spam campaign in the spam database by creating the association.

14. The system of claim 11, wherein:
the determination module determines whether the distance between the image of the suspicious webpage and the spam image is below the difference threshold by determining that the distance is above the difference threshold;
the determination module further determines whether the web address of the suspicious webpage is associated with the spam campaign by determining, based on the distance being above the difference threshold, that the web address of the suspicious webpage is part of a new spam campaign; and
the database module further creates, in the spam database, an association between the web address of the suspicious webpage and the new spam campaign.

15. The system of claim 11, wherein:
the comparison module further compares the image of the suspicious webpage to the spam image by:
calculating a hash of the suspicious webpage, and
determining that the hash of the suspicious webpage does not match a hash of the spam image; and
the comparison module calculates the distance between the image of the suspicious webpage and the spam image in response to the determination that the hash of the suspicious webpage does not match the hash of the spam image.

16. The system of claim 11, wherein:
the determination module determines whether the web address of the suspicious webpage is associated with the spam campaign by determining that the web address of the webpage is associated with the spam campaign;
the database module updates the association between the web address of the suspicious webpage and the spam campaign in the spam database by creating the association; and
the system further comprises:
determining that the web address of the suspicious webpage is no longer part of the spam campaign, and
in response to the determination that the web address of the suspicious webpage is no longer part of the spam campaign, removing the association between the web address of the suspicious webpage and the spam campaign.

17. A non-transitory computer-readable medium comprising one or more computer-executable instructions, that, when executed by at least one processor of a computing device, cause the computing device to:
receive, at a backend anti-spam server from a client-side anti-spam service, a web address of a suspicious webpage that potentially hosts a spam message;
perform, by the backend anti-spam server, an initial analysis step on the web address of the suspicious webpage by determining that the web address of the suspicious webpage does not match any spam web addresses already stored in a spam database;
in response to determining that the web address of the suspicious webpage does not match any of the spam web addresses already stored in the spam database, using a processor of the backend anti-spam server to:
capture an image of the suspicious webpage; and
normalize the image of the suspicious webpage by scaling the image to a specified resolution;
compare, by the backend anti-spam server, the image of the suspicious webpage to at least one spam image from the spam database by calculating a distance between the image of the suspicious webpage and the spam image, the spam image being associated with a spam campaign in the spam database;
determine, by the backend anti-spam server, whether the web address of the suspicious webpage is associated with the spam campaign by determining whether the distance between the image of the suspicious webpage and the spam image is below a difference threshold; and
in response to the determination of whether the web address of the suspicious webpage is associated with the spam campaign, update, by the backend anti-spam server, an association between the web address of the suspicious webpage and the spam campaign in the spam database.

18. The non-transitory computer-readable medium of claim 17, wherein the one or more computer-executable instructions cause the computing device to:
further compare the image of the suspicious webpage to the spam image by:
calculating a hash of the suspicious webpage, and
determining whether the hash of the suspicious webpage matches a hash of the spam image;
determine whether the web address of the suspicious webpage is associated with the spam campaign by determining that the hash of the suspicious webpage matches the hash of the spam image; and
update the association between the web address and the spam campaign in the spam database by creating the association.

* * * * *